United States Patent Office 2,912,028
Patented Nov. 10, 1959

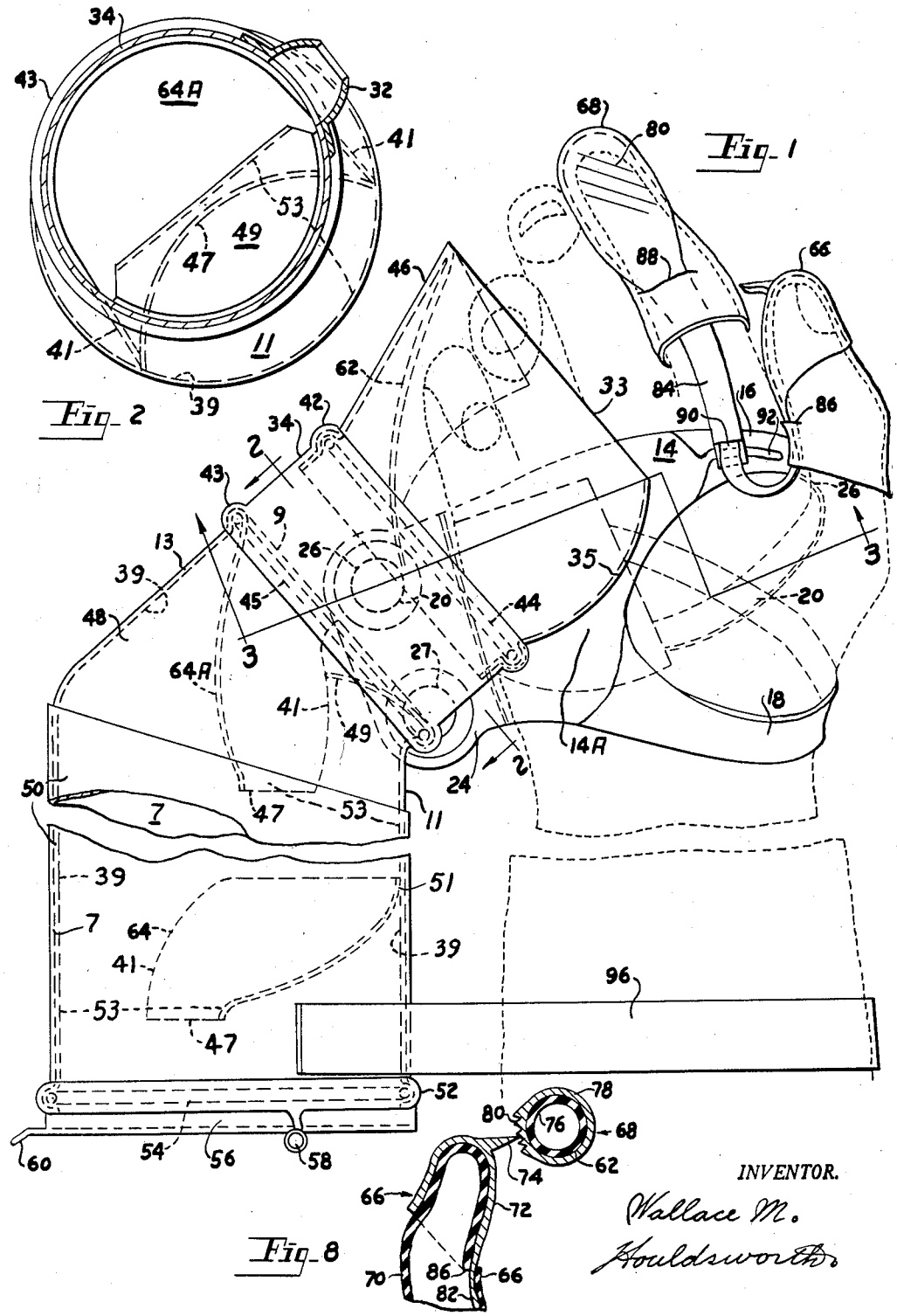

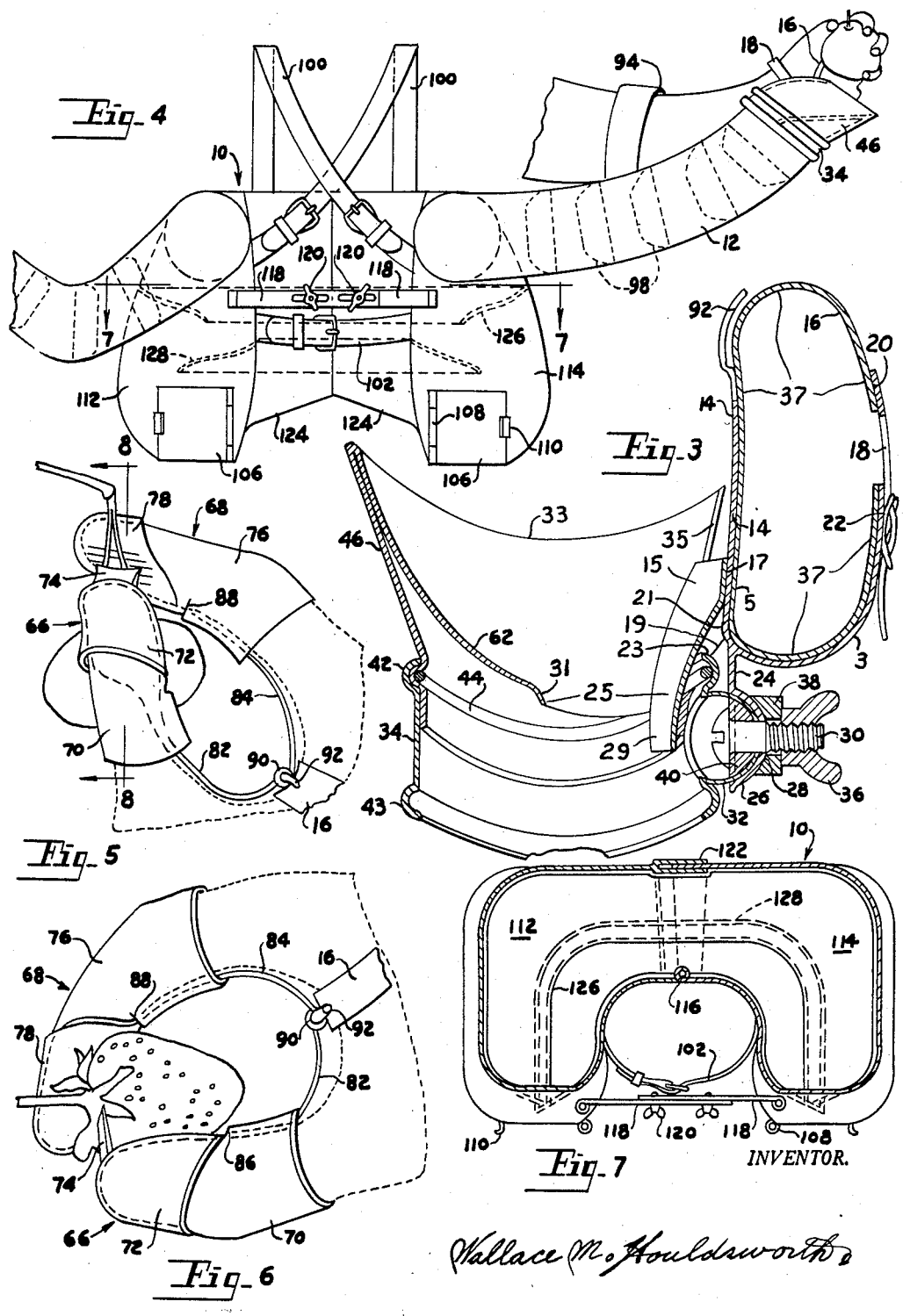

2,912,028
FRUIT PICKING DEVICE

Wallace M. Houldsworth, Royal Oak, Mich.

Original application August 3, 1949, Serial No. 108,299, now Patent No. 2,712,335, dated July 5, 1955. Divided and this application May 11, 1955, Serial No. 507,613

7 Claims. (Cl. 150—2)

This invention, a division of application, Serial No. 108,299, that issued as Patent No. 2,712,335, on July 5, 1955, relates to devices for harvesting crops and particularly to a device of this character for picking fruits.

The invention relates to improvements in harvesting devices and particularly to improvements for picking fruit where the picker is interrupted at intervals of time to deposit the picked fruit in a collecting receptacle. An important object of the invention is to provide a combination portable device worn by the operator and including a container having means of one way travel for receiving the picked crop, a flexible tube or chute having means of one way travel for delivering the picked crop or fruit thereto, and means associated with the hands of the operator for severing the crop or fruit from the stems and for delivering the fruit by means of the tube of the container.

Another important object of the invention is to provide an improved holder for the inlet or mouth of a container or delivery chute which is designed in a novel manner for fastening to the hand of the operator, and in such a manner that the mouth may be adjusted to any convenient position for receiving the picked fruit or other product. Another important object of the invention is to provide an improved device of this character so arranged that the delivery tube or chute for the fruit can be suspended at its outer end from the bottom of the operator's hand and at an intermediate point under the arm of the operator adjacent to the elbow so that the entrance opening of the chute will be immediately adjacent to the hand in whatever position the hand is moved.

In carrying out the invention, the hand engaging mouth or entrance through which the picked product is fed is provided with flexible band portions through which the hand extends so as to firmly hold the mouth immediately adjacent thereto. Associated with the mouth of the device is a flexible lip extending upwardly and flaring outwardly so as to form a funnel opposite the palm of the hand, and in such a manner that said hand forms a part of said funnel, in order that the operator may hold small objects in his hand, and upon elevating the hand, release the fruit and cause the fruit to roll into the mouth. Associated with the mouth is a fruit receiving tube which may extend to a relatively small receptacle carried on the arm of the picker or may form an extension to a delivery chute leading to a large container carried on the body of the picker.

Incorporated in the tube are retarding shelves which may be of varying shapes, sizes and number depending upon the product to be harvested and which serve to break the fall of the picked fruit or other product, act as partial floors to carry part of the fruit or other object deposited therein and prevent the return flow thereof, providing means of one way travel, and to hold the flexible walls of the delivery tube from collapsing upon themselves.

In a modification of the invention, the hand held mouth of the device is associated with an arm length delivery chute which opens into a relatively large container preferably of U-shaped formation and of a size to partially embrace the operator's body which may be suspended by suitable straps from the shoulders of the operator while the device is in use. The container is preferably formed in a novel manner of two half-sections hinged together and provided across the opened end of its U-shaped formation with an adjustable strap which may traverse the front of the body of the operator and permit adjustment to accommodate the container to the size of the operator.

In further carrying out the invention, there is provided a novel form of fruit cutting or severing device constructed of two thimbles, one of which may be worn on the thumb and the other of which may fit the first finger of the hand of the operator. One of the thimbles, such as that worn on the thumb, is provided with a tooth having a relatively straight cutting edge which extends crosswise to the length of the thumb and is adapted to abuttingly engage the other thimble in the act of severing fruit from their stems. An important feature of this provision is a hinged joint which connects the two thimbles together yet serves to yieldingly space them apart so that little effort is required by the operator other than to draw the thimbles together to cut or sever fruit or similar objects from their stems. An important feature of the finger carrying thimbles is the novel provision for detachably connecting the same to the holder of the chute and particularly for mounting the hinged joint thereof on one of the hand encircling straps of the holder.

As a result of this invention there is provided a device so designed that many different kinds of fruit or other crop may be conveniently harvested, the device being adjustable and capable of modification for the picking of fruit or other crop of different sizes. The product receiving end of the device is capable of being rigidly mounted on the hand of the operator, yet leave the fingers for picking the fruit. The hand engaging portion of the device is constructed in a novel manner to receive a cutting mechanism for readily severing fruit from its stems, the cutting mechanism being capable of detachment when its use is not desired. The parts of the device are designed for manufacture and assembly at low cost and for quick and economical use.

Various other objects, advantages and meritorious features of the invention will become more fully apparent from the following specification, appended claims and accompanying drawings, wherein:

Fig. 1 is a side elevation of the hand connected end of a delivery tube or chute showing the manner of mounting the same on the hand and the provision of cutters associated with the thumb and forefinger which are connected to the hand engaging portions of the chute, Fig. 2 is a transverse sectional view taken along line 2—2 of Fig. 1, Fig. 3 is a sectional view taken along line 3—3 of Fig. 1, Fig. 4 is a front elevation of the entire device including the container which partially encloses the body of the operator and showing two delivery chutes, one associated with each hand of the operator, for feeding picked fruit and other objects to the container, Fig. 5 is a detail view illustrating the function of the cutting device worn on the thumb and forefinger of the operator for picking fruit such as cherries, Fig. 6 is a detail view somewhat similar to Fig. 5 illustrating the finger worn cutting device for picking strawberries without their hulls, Fig. 7 is a horizontal sectional view taken along line 7—7 of Fig. 4 and illustrating the U-shaped construction of the container, and Fig. 8 is a sectional view taken along line 8—8 of Fig. 5.

In general, the device is capable of modification by the user to receive fruit and other agricultural products of different sizes. For large fruit, such as apples, peaches and the like, the device includes a relatively large container worn around the body of the operator. For smaller fruits, such as cherries and strawberries, the device may be modified to provide a smaller container worn on the arm of the operator. Either container may be substituted for the other by the user of the device.

For larger fruit or other crop there is provided a relatively large receptacle or container generally indicated at 10 in Fig. 4 which is preferably shaped so as to partially enclose the body of the operator below the shoulders and in horizontal section has a general U-shaped formation as shown in Fig. 7. The container is usually worn so as to extend across the back of the operator and forwardly on either side of his body. Suitable straps hereinafter described are provided for suspending the container in this partially wrapped manner on the body of the operator. Connected to either one or both of the forwarding extending side portions of the container is a flexible delivery tube or chute 12 which may be formed of canvas material or the like and has a length such that it will reach substantially the full length of the out-stretched arm of the operator. The inner end of the chute preferably opens into the upper level of the container as shown in Fig. 4. The opposite end of the chute 12 is connected to the hand of the operator and as will be described more fully hereinafter is capable of receiving fruit or other products which the operator picks.

For smaller fruit or other products there is illustrated in Figs. 1, 2 and 3 a smaller receptacle or container which is worn on the arm of the operator and is interchangeable with the delivery chute 12 previously mentioned. For this purpose there is provided a holder 14 formed of relatively rigid material similar to light-weight metal, said holder having a curved oblong shape, a palm portion 14A, which is formed to fit flatwise and transversely in the palm of the operator's hand, and has a curved arcuate portion 3 which partially encircles the part of the hand opposite to the thumb. The holder is provided with a strap portion 16 which passes between the thumb and forefinger and another strap portion 18 which passes around the base of the thumb adjacent to the wrist. The holder may have a lining 5 of soft material, said lining and the two strap portions may be composed of any suitable relatively flexible material such as leather. As shown in Fig. 1, the two strap portions 16 and 18 cross one another at 20 on the back side of the hand. As shown in Fig. 3 either one or both of the straps may be provided with a buckle 22 for drawing the same relatively tightly to the hand of the operator.

The holder 14 is provided with a lateral extension 24 shown in Fig. 3 which is connected by means of a swivel joint to the outer end of a delivery tube which may be the chute 12. The swivel joint enables the holder 14 to be adjusted to vary the angular relationship between the holder and the end of the tube to suit the convenience of the picker. The lateral extension 24 is provided with two correspondingly shaped spherical concave sockets 26 and 27 as shown in Fig. 1 arranged in side by side slightly spaced apart relationship. Either socket may be used for connection to the top end of the delivery tube and since the sockets and associated elements are the same only one socket may be described in detail herein. Each socket is provided with a relatively large aperture 28. A bolt 30 which is undersize the aperture 28 extends therethrough. Each concave socket 26 is adapted to alternately receive a spherical convex boss 32 which is connected either integrally or by separate means to a metallic collar or throat band 34 forming a part of the top end of the fruit receiving end of the device. The head of the bolt 30 is located inside the boss as shown in Fig. 3 and the threaded extremity thereof projects outwardly from the socket 26 and receives a wing nut 36 which provides adjustable clamping engagement between the parts. To facilitate the clamping engagement a concaved washer 38 is disposed between the wing nut and the socket 26 and is provided with a spherical face abutting the socket as shown in Fig. 3. The head of the bolt 30 rests upon a convexed washer 40 having a spherical face seating upon the interior surface of the boss 32. The resulting construction enables the user to loosen the wing nut to provide rotatable and limited angular adjustment of the holder 14 relative to the collar 34 and when the desired adjustment has been made the wing nut may be tightened to secure the parts rigidly against relative movement.

The collar 34 is preferably made of metal or similar relatively rigid material and has a hollow circular shape, and is formed at its opposite ends to provide two peripheral bulges as shown at 42 and 43 for receiving and securing in place a funnel shaped lip 46 on one end and the top end of either the long delivery tube 12 or a short flexible delivery tube 7 with a neck section 48. In each peripheral bulge there is provided an expandible split ring, the ring for the bulge 42 being indicated at 44 and the ring for the bulge 43 being indicated at 45. These rings serve to disconnectibly couple the lip and tube sections to the collar 34. The lip 46 is preferably formed of flexible material such as rubber and the like and flares outwardly as indicated in Figs. 1 and 3 to form a funnel shaped entrance for receiving the picked fruit or other product. The funnel-shaped lip extends outwardly from the collar and approximately three quarters of the way therearound, leaving an opening which the palm portion of the hand will close when in use. When the holder is assembled on the hand of the operator, the fourth and fifth fingers of his hand are disposed within the funnel-shaped lip 46 in the manner shown in dotted outline in Fig. 1. This enables the operator to hold small objects such as strawberries, cherries and the like when picking the same below the level of the outer end of the delivery tube and upon raising his hand above this level he may let go of the picked fruit and allow it to roll into the funnel-shaped mouth formed by the lip 46.

The throat band or collar 34, as previously mentioned, is secured to the top end 9 of the short tube 7. The section 48 which serves as a flexible neck between the collar 34 and a casing 50 when used, said neck has a short side 11, which is positoned at approximately 90° from the boss 32 of the collar 34, and a long side 13 positioned opposite to the short side as shown in Figs. 1 and 2. At a spaced point below the band 34 the delivery tube may be encircled by a sleeve or casing 50 of relatively rigid material such as light-weight metal and shown in Fig. 1. The lower end of the sleeve or casing 50 is outwardly formed to provide a peripheral bulge 52 completely there-around. Received inside of the tube 48 opposite to the peripheral bulge 52 is an expandible split ring 54 which spreads the portion of the tube against which it bears into the peripheral bulge and in this manner holds the tube to the casing. The lower end of the casing is normally closed by a flap door 56 hinged at 58 as shown in Fig. 1, or similar thereto may be used. A projecting ledge 60 on the flap door on the side opposite to the hinge enables the operator to open the door in order to discharge the picked fruit or other product therethrough. Either the hinge 58 may be provided with a wire spring which yieldingly urges the flap door to the closed position shown in Fig. 1 or the ledge 60 may be provided with means for releasably locking the door to the casing in closed position.

The hand held portion of the device including the funnel-shaped lip 46 and the tube 12 or tube section 48 is provided with retarding retainer shelves therein which break the fall of the picked fruit to prevent bruising thereof, when the casing 50 is used, they act as partial floors to carry part of the weight of the picked fruit, and also serve to hold the product from falling out of the mouth, when the mouth is disposed below the level of the neck and casing sections. These retarding retainer shelves also serve to hold the flexible tube 12 or tube 7 and its neck section 48 from collapsing diametrically upon itself.

As shown best in Fig. 3, the funnel-shaped lip 46 may be provided with an inturned flexible tongue 62, and the holder 14 may have a flexible shield 15 secured to said holder at 17. Both the tongue 62 and shield 15 incline downwardly and inwardly, into the entrance of the delivery tube or collar 34. The shield 15 covers the space 19 between the outer surface 21 of the holder 14 and a portion of the top end 23 of the collar 34. A small aperture or entrance 25 is produced between the lower end 29 of the shield 15 and the lower end 31 of the tongue 62.

The tongue 62 may have a three-quarter funnel-shape similar to that of the lip 46, and they are secured along their top edge 33 and their two side edges 35—35. Thus forming a funnel with its small aperture 25 adjacent the lower edge of the operator's hand, since said hand is positioned within the space 37, which is surrounded by the lining 5 and strap portions 16 and 18, as shown in Figs. 1 and 3. At points further spaced from the mouth of the tube there are provided a plurality of semi-flexible conic shaped retainer shelves 64—64, each having approximately a half funnel-shape, and each inclining inwardly from the entrance end and the inner wall surface 39 of the tube 7 and its neck portion 48. Each retainer 64 is secured along its longitudinal side edges 41—41 and its upper large diametrical portion 51 transversely to the innerwall 39, as shown in Figs. 1 and 2. And each has an off-center aperture 53 between its lower free edge 47 and a portion of the inner-wall 39 opposite said free edge forming a funnel.

The retainer shelves are positioned in the tube transversely in alternately staggered relationship to one another, and are spaced at predetermined locations longitudinally, so that the picked product will travel zigzaggedly therein. The first of said retainer shelves 64A to be secured to the top 9 and adjacent the long side 13 of the neck 48. A guide 49 of flexible material may be used, which is positioned opposite and extending inwardly toward the retainer shelves 64A, said guide 49 is secured to the top 9 and adjacent to the short side 11 of the neck 48. The number of the retainer shelves to be used in a given length of space, or the distance between said shelves and the size of their apertures, are predetermined by the size and bruising quality of the product to be picked.

These shelves may be formed of separate pieces secured to the inner-wall of the flexible tube, or as in the instance of the upper retainer shelf 64A, they may be formed integrally with the material of either tube or neck section 48. The picked fruit falls against the tongue 62 and alternately against the semi-yielding shelves 64—64 and the falling movement thereof is retarded sufficiently to prevent bruising. After passing the first retainer shelf, if the operator lowers his forearm to resume picking, the product falls behind the nearest retainer shelf, thus several of said shelves provide means of one-way travel and picking from the ground when the casing 50 is used with the tube. The shelves 64—64 also serve, as hereinabove mentioned, to carry part of the picked product, when the lower end of the tube is normally closed, thus forming a container with several compartments formed by said shelves, to prevent bruising by the accumulating weight.

Associated with the holder 14 and its parts, and removable therefrom when not desired, is a cutting appliance for severing fruit from their stems or hulls. The cutting implement comprises two thimble-shaped members preferably worn on the thumb and forefinger of the picker. The thumb receiving thimble is generally indicated at 66; the forefinger receiving thimble is generally indicated at 68. The thumb thimble comprises a flexible sheath 70 of rubber or like material which substantially completely encloses the thumb. A relatively rigid cap 72 of metal or like material overlies the flexible sheath and encloses the extremity of the thumb. The cap carries a tooth or knife blade 74 which extends crosswise to the thumb adjacent to the outer end thereof and projects toward the forefinger. The thimble 68 on the forefinger is generally like the thumb thimble and comprises an inner flexible sheath or covering 76 of rubber-like material which encloses the major portion of the finger and an outer cap 78 of relatively rigid material which encloses the tip of the finger. It is preferred to form on the side of the cap 78 facing the thumb a plurality of parallel indented lines or shallow grooves 80 which extend substantially in the same direction as the knife-edge of the blade 74. In use, the grooves receive the knife-edge of the blade at the completion of the cutting stroke in the manner shown in Fig. 8 and prevent slippage of the blade. In addition, the grooves frictionally resist movement of the stem of the fruit being picked during the severing operation.

An important feature of the device is the arrangement for disconnectibly coupling the two thimbles on the holder 14 and for providing convenient manipulation of the thimbles. As shown in Figs. 1, 5, 6 and 8 each cap member of the two thimbles is provided with an extension which runs to the base of the finger with which it is associated and enters the crotch between the thumb and forefinger. The extension for the cap 72 is indicated at 82 and is in the form of a narrow band of the same material as the cap and integrally connected thereto at one end and having the opposite end disposed in the crotch between the forefinger and thumb. In a similar manner, the narrow extension 84 for the cap 78 is integrally connected at its outer end thereto and extends to the crotch of the thumb and forefinger. Preferably each sheath 70 and 76 is provided with a slit indicated respectively at 86 and 88 intermediate its ends and adjacent to the lower margin of the cap through which the cap extension enters so as to lie against the skin of the finger and under the lower section of the sheath. The sections of the sheaths which lap over the extension 82 and 84 act as rubber bands for holding the extensions against the thumb and forefinger. At the crotch of the thumb and forefinger the inner ends of the cap extensions 82 and 84 may be coiled one or more turns as indicated at 90 to form a hinge joint.

Carried by the holder 14 and projecting into the crotch from the palm of the hand is a pin 92. This pin is disposed in slightly spaced relation to the crotch and is adapted to enter the aligned coils 90 of the two extensions 82 and 84 and serve as a pintle about which the extensions and their respective cap members may swing. Preferably the pin 92 has a free end in order to enable the coiled end portions of the extensions to be readily slipped on and off the pin so that for large fruit the picker may disconnect the thimble members from the device. When the thimbles are mounted in the operating position shown in the drawings, the pin serves to hold the cap extensions in proper position and to hold the extensions from shifting out of either side of the crotch between the thumb and forefinger. The cutting edge of the blade is thus properly aligned with the grooves 80 at all times. The pin may be formed of sufficiently flexible metal so its free end may be bent toward the strap 18 as shown in Figs. 3 and 5 to hold the extensions in place.

The cutting edge of the blade 74 may be arcuately shaped as shown in Fig. 5 to conform to the radius of curvature of the forefinger cap 78. This enables the blade to cut stems of cherries and similar fruit near the fruit leaving the major portion of the stems on the tree. For picking strawberries, the cutting element may be in the form of a tooth longer than the blade of Fig. 5 and provided with a shorter cutting edge as shown in Fig. 6. This enables the thimble members to pick strawberries without their hulls and thus eliminate the hulling operation.

Either the long delivery tube 12, or short tube 7, or the container formed by normally closing the lower end, or by using the casing 50 are preferably connected to the forearm of the operator so as to follow the movement of the arm, and both hands and arms may be equipped in a similar manner. As shown in Fig. 4, a band 94 encircles the arm of the picker and is connected to the tube 12 at a point approximately mid-way between its ends. As shown in Fig. 1, the container 50 is provided with a band 96 which encircles the arm of the picker. Each delivery tube 12 of the device may be provided interiorly with retainers or shelves 98 which retard the fall of the fruit therethrough and act to space the flexible walls of the tube apart, said retainers are similar in shape and function as the retainer shelves 64.

The body worn container shown generally in Fig. 4 has a U-shaped cross sectional formation as previously mentioned. Crossing shoulder straps 100—100 of corresponding formation suspend the container from the shoulder of the picker. A horizontal strap 102 may be provided across the front of the picker to connect the opposite sides of the container together. Buckles may be provided on all straps for adjusting the device to the body size of the picker. The front edge of each side portion of the container may be provided with a door 106 opening into the lower level of the container from which picked fruit is removed. Each door may be hinged on one side as indicated at 108 and provided with a releasable catch 110 on the opposite side.

An important feature of the large container's construction is the arrangement whereby the right and left hand sections of the U-shaped body are hinged together about a central vertical axis for swinging movement relative to one another. The right hand section is indicated at 112 and the left hand section at 114. The inside back portion of the two sections are shaped to form hinge leaves which encircle a vertical hinge pin 116. The two side sections of the container are thus swingable about a vertical axis. To hold the side sections in adjusted position there is provided an extensible and contractible relatively rigid connection extending between the outer front ends of the side sections. This connection is formed by two over-lapping bracket members 118—118. These members are connected at their outer ends to the forward portions of the two side sections of the entrance and normally will extend in slight spaced relation to the front of the body of the picker. By means of wing nut assemblies 120—120 and horizontal slots in the bracket members, the overlapping inner end portions thereof are rigidly clamped together in any desired adjusted condition. The bracket members hold the two sides of the container in the desired angular relation about the pivot pin 116.

The back portions of the two side sections 112 and 114 overlap upon one another and normally maintain the container in closed condition. As shown in Fig. 7, one side section of the container, such as the right side 112 is provided along the outside back edge and bottom with a leftwardly opening relatively deep recess or channel 122. The side walls of the channel extend leftwardly beyond the hinge axis and receive therein the outside back and bottom edge of the left section 114 in the manner shown in Fig. 7. The overlapping back and bottom marginal portions of the two side sections serve to close the container when worn by the picker but it is evident that they may be separated from one another after removal of the device from the picker to quickly remove the collected fruit and to clean the interior. The inside surfaces of the two sections 112 and 114 may be lined with relatively soft material, such as canvas, as indicated in Fig. 7.

The back portion of each side section 112 and 114 of the container may be provided with an outwardly and downwardly inclined floor such as shown at 124—124 in Fig. 4. The two inclined floors cooperate to direct the picked fruit toward the doors 106—106 on the front side of the container 10. It is preferred to provide the container interiorly with retarding shelves similar in function to the shelves 64 and 98 previously described. Two such shelves are shown in the container at 126 and 128 and these are arranged in alternate staggered overlapping relation to catch and retard the fall of fruit thereon and to carry a part hereof as the container becomes full.

There is thus described an improved fruit picking device which enables the picker to gather fruit and similar produce without intermittently stopping to place the picked fruit in a receptacle. For large fruit, as shown in Fig. 4, the picker wears the large container 10 around his body and attaches each delivery chute 12 thereof to a hand supported throat band 34. Large fruit such as apples and peaches are allowed to fall into the funnel-shaped mouth 46 and thence be conveyed through the chute 12 to the container 10. The retarding shelves in the mouth, delivery chute and container slow the movement of the fruit so that the fruit moves relatively slowly and without bruising into the container 10 and serve to carry part of the accumulating weight of the picked products as the container becomes full. For small fruit, if desired, the picker attaches the thimble members 66 and 68 to his thumb and forefinger and hinges these members to the hand holder 14. In place of the large container 10, the picker may substitute the receptacle formed by the casing 50. This is readily accomplished by contracting the split ring 45 and attaching the neck 48 in place of the chute 12 to the throat band. The various adjustable elements on the device enable the picker to fit the parts to his size and convenience. Depending on the character of the product picked, either one of the sockets 26 or 27 may be used to connect the hand holder to the throat band. Likewise, the swivel joint provided by the selected socket and the boss 32 enables the picker to adjust the mouth to the most convenient position for receiving the picked products, that is picked adjacent to the mouth of the delivery tube and in some cases within said mouth, and can be held by the picker's fingers within the mouth as the picker's hand forms a part of said mouth.

While it is primarily described for fruit mainly berries, it is likewise useful for picking peas and other products. The number of shelves in the tubes and containers depends on the size and character of the product to be picked, thus a device economical to manufacture and use as it is possible to pick from the ground or overhead, and as a device adjustable to pick several products or a specific product.

What I claim is:

1. In a fruit picking device of the character described, a hollow circular shaped collar and a curved oblong shaped holder of relatively rigid thin material, the holder having a palm portion formed to fit flatwise and transversely within the palm of the operator's hand, one end of said holder having a curved arcuate shaped portion formed to extend around and along the edge of said hand, the holder having a lateral portion which extends laterally from the convexed side of the arcuate portion, the collar and the lateral portion formed for swivel connection of one to the other in at least one location, and means for rigidly securing them together in adjusted lateral positions oppositely from the arcuate portion.

2. In a fruit packing device of the character described, a relatively flexible delivery tube, one end of said tube designated as the entrance end, the tube having a plurality of semi-flexible conic shaped retainers positioned within the interior of said tube, each retainer to incline inwardly from the entrance end and inner-wall of said tube, the large diametrical portion of each retainer being secured upwardly and transversely, and the side edges of said retainer are secured longitudinally to the inner-wall of the said tube, each retainer having a free lower edge which forms an off-center aperture with the inner-wall opposite said free edge, the retainers are spaced longitudinally at predetermined positions, so that their apertures are positioned in alternate staggered relationship to one another, the large diametrical portion of the first retainer being positioned adjacent to the entrance of the tube.

3. In a fruit picking device of the character described, a hollow circular shaped collar and a curved oblong shaped holder of relatively rigid thin material, the holder having a palm portion formed to fit flatwise and transversely within the palm of the operator's hand, the holder also having an arcuate portion extending around and along the edge of said hand opposite the thumb, the portion of the holder adjacent the operator's wrist designated as the rear end of the holder, a lateral portion secured to and extending laterally from the convexed side of the arcuate portion, the collar and the lateral portion formed for swivel connection of one to the other in at least one location, and means for rigidly securing them together in adjusted lateral positions oppositely from the arcuate portion, a relatively flexible delivery tube with its entrance end positioned to one end of the collar and means for securing them together, thus designating the other end of the collar as its top end, tube carrying means for securement thereof in a juxta-position longitudinally beneath and to the operator's forearm, means positioned at a predetermined distance from the collar and forming a flexible neck portion between the securement means and the collar, the tube having a plurality of semi-flexible conic-shaped retainers positioned within the interior of the said tube, the large diametrical portion of each retainer being secured upwardly toward the entrance end and transversely, with the first retainer located adjacent to the entrance of the tube, the side edges of each retainer are secured longitudinally to the inner-wall of the said tube, each retainer having a free lower edge which forms an off center aperture with the inner-wall opposite said free edge, thus forming a funnel which inclines inwardly from the entrance end and inner-wall of said tube, the said retainers are spaced longitudinally at predetermined positions and arrange with their apertures in alternate staggered relationship to one another, thus providing means of one-way travel within the delivery tube.

4. The device of claim 3, wherein, a flexible lip having approximately a three-quarters funnel shape, is positioned on the top end of the collar oppositely to the palm portion of the holder, and means for securing the lip to the collar, the lip extends upwardly and outwardly to a predetermined height providing means for the fingers of the operator's hand to work within the entrance of the device.

5. The device of claim 3, wherein, a flexible lip is positioned on the top end of the collar and means for securing them together, the lip extends upwardly to a predetermined height and has an inturned flexible tongue, both the lip and the tongue having approximately a three-quarters funnel-shape and are arranged oppositely to the palm portion of the holder, the top edge and upright edges of both said lip and said tongue being secured together, the tongue projects on an incline into the entrance of the collar, the lower edge of the tongue being free and forming an off-center aperture within the entrance of the collar, thus the tongue becomes a retainer adjacent to the operator's hand and enabling his fingers to work within the entrance with more efficiency.

6. The device of claim 5, wherein, the entrance end of the tube is secured in a predetermined position to the collar, in such a manner as to place the aperture formed by the first retainer at approximately 90° rearwardly from the center line of the swivel connection of the collar and the lateral portion of the holder, and means for normally closing the opposite end of the tube forming a container, thus providing means which enables picking from the ground and upward conveyance of the picked product.

7. The device of claim 5, wherein, the securement means for securing the tube in a juxta-position longitudinally beneath and to the operator's forearm includes a casing and an arm encircling band thereon, the casing of relatively thin rigid material encircles a portion of the tube, and the flexible neckportion of the tube has a long side and a short side between the said casing and the said collar, with the first retainer located adjacent to the entrance of the tube and the long side of the neck, the short side of the neck being positioned oppositely from the long side thereof, the short side of the neck and the band of the casing being positioned along the same side of the said tube, and means for normally closing the end thereof opposite the said holder forming a container, thus providing more efficient means for picking from the ground and upward conveyance of the picked product.

References Cited in the file of this patent

UNITED STATES PATENTS

| | | |
|---|---|---|
| 366,721 | Graves | July 19, 1887 |
| 1,170,960 | Canterbury | Feb. 8, 1916 |
| 1,309,119 | Dillon | July 8, 1919 |
| 1,404,163 | Pim | Jan. 17, 1922 |
| 1,600,566 | Ricketts | Sept. 21, 1926 |
| 1,715,111 | Younie | May 28, 1929 |
| 2,377,623 | French | June 5, 1945 |